United States Patent
Watson

(10) Patent No.: US 9,003,539 B2
(45) Date of Patent: *Apr. 7, 2015

(54) MULTI VIRTUAL MACHINE ARCHITECTURE FOR MEDIA DEVICES

(75) Inventor: Scott F. Watson, Marina Del Rey, CA (US)

(73) Assignee: Disney Enterprises, Inc., Burbank, CA (US)

(*) Notice: Subject to any disclaimer, the term of this patent is extended or adjusted under 35 U.S.C. 154(b) by 373 days.

This patent is subject to a terminal disclaimer.

(21) Appl. No.: 12/288,714

(22) Filed: Oct. 21, 2008

(65) Prior Publication Data

US 2009/0172820 A1    Jul. 2, 2009

Related U.S. Application Data

(63) Continuation of application No. 10/890,009, filed on Jul. 12, 2004, now Pat. No. 7,469,346, which is a continuation-in-part of application No. 10/880,060, filed on Jun. 28, 2004, now abandoned.

(60) Provisional application No. 60/481,034, filed on Jun. 27, 2003, provisional application No. 60/481,066, filed on Jul. 7, 2003, provisional application No. 60/493,072, filed on Aug. 5, 2003.

(51) Int. Cl.
| | |
|---|---|
| H04N 7/16 | (2011.01) |
| G06F 15/177 | (2006.01) |
| G06F 9/455 | (2006.01) |
| G06F 21/10 | (2013.01) |
| G06F 21/53 | (2013.01) |
| G06F 21/57 | (2013.01) |

(52) U.S. Cl.
CPC ............ *G06F 21/10* (2013.01); *G06F 9/45504* (2013.01); *G06F 21/53* (2013.01); *G06F 21/57* (2013.01); *G06F 2221/0735* (2013.01)

(58) Field of Classification Search
USPC ........ 713/150, 193; 380/201; 718/1; 717/148
See application file for complete search history.

(56) References Cited

U.S. PATENT DOCUMENTS

| | | | |
|---|---|---|---|
| 4,333,152 A | 6/1982 | Best | |
| 4,792,895 A | 12/1988 | Tallman | |
| 4,831,541 A | 5/1989 | Eshel | |

(Continued)

FOREIGN PATENT DOCUMENTS

| | | |
|---|---|---|
| EP | 0982947 | 3/2000 |
| EP | 1 280 042 A2 | 2/2003 |

(Continued)

OTHER PUBLICATIONS

Schödl, et al., *Controlled Animation of Video Sprites*, Georgia Institute of Technology college of Computing, pp. 121-127, 196 (2002).

(Continued)

*Primary Examiner* — Matthew Henning
(74) *Attorney, Agent, or Firm* — Farjami & Farjami LLP

(57) ABSTRACT

A software computing based environment for providing secured authentication of media downloaded from a network or loaded from a media player includes two peer-mode operating virtual machines. The low-level virtual machine provides decoding and decryption functions whereas the high-level virtual machine provides application level functions such as user interface, input/output.

18 Claims, 3 Drawing Sheets

(56) References Cited

U.S. PATENT DOCUMENTS

| | | | |
|---|---|---|---|
| 5,522,075 A | 5/1996 | Robinson | |
| 5,548,340 A | 8/1996 | Bertram | |
| 5,606,374 A | 2/1997 | Bertram | |
| 5,634,850 A | 6/1997 | Kitahara | |
| 5,692,193 A | 11/1997 | Jagannathan | |
| 5,699,123 A | 12/1997 | Ebihara et al. | |
| 5,708,845 A | 1/1998 | Wistendahl | |
| 5,818,439 A | 10/1998 | Nagasaka | |
| 5,892,521 A | 4/1999 | Blossom | |
| 5,893,084 A | 4/1999 | Morgan | |
| 5,929,849 A | 7/1999 | Kikinis | |
| 5,956,092 A | 9/1999 | Ebihara | |
| 5,987,509 A | 11/1999 | Portuesi | |
| 6,069,669 A | 5/2000 | Park | |
| 6,262,746 B1 | 7/2001 | Collins | |
| 6,362,816 B1 | 3/2002 | Kawanami | |
| 6,373,500 B1 | 4/2002 | Daniels | |
| 6,407,779 B1 | 6/2002 | Herz | |
| 6,493,038 B1 | 12/2002 | Singh | |
| 6,539,240 B1 | 3/2003 | Watanabe | |
| 6,570,587 B1 | 5/2003 | Efrat | |
| 6,715,085 B2 * | 3/2004 | Foster et al. | 726/27 |
| 6,772,340 B1 | 8/2004 | Peinado | |
| 6,868,449 B1 | 3/2005 | Miyamoto | |
| 6,922,774 B2 * | 7/2005 | Meushaw et al. | 713/151 |
| 7,027,101 B1 | 4/2006 | Sloo | |
| 7,043,726 B2 | 5/2006 | Scheetz | |
| 7,051,005 B1 | 5/2006 | Peinado | |
| 7,069,311 B2 | 6/2006 | Gupta | |
| 7,076,652 B2 | 7/2006 | Ginter | |
| 7,120,251 B1 | 10/2006 | Kawada | |
| 7,136,945 B2 | 11/2006 | Gibbs | |
| 7,162,531 B2 | 1/2007 | Paz | |
| 7,203,968 B2 | 4/2007 | Asano | |
| 7,210,144 B2 | 4/2007 | Traut | |
| 7,308,717 B2 | 12/2007 | Koved | |
| 7,421,586 B2 | 9/2008 | Luo | |
| 7,469,346 B2 * | 12/2008 | Watson | 713/193 |
| 2001/0021926 A1 | 9/2001 | Schneck | |
| 2002/0046345 A1 * | 4/2002 | Takeuchi et al. | 713/190 |
| 2002/0054049 A1 | 5/2002 | Toyoda | |
| 2002/0059456 A1 | 5/2002 | Ha | |
| 2002/0060750 A1 | 5/2002 | Istvan | |
| 2002/0083449 A1 | 6/2002 | Im | |
| 2002/0097280 A1 | 7/2002 | Loper | |
| 2002/0138851 A1 | 9/2002 | Lord | |
| 2002/0141582 A1 | 10/2002 | Kocher | |
| 2002/0141741 A1 * | 10/2002 | Zou et al. | 386/125 |
| 2002/0144153 A1 * | 10/2002 | LeVine et al. | 713/201 |
| 2002/0146008 A1 * | 10/2002 | Kaplan | 370/390 |
| 2002/0161996 A1 | 10/2002 | Koved | |
| 2002/0162117 A1 | 10/2002 | Pearson | |
| 2002/0169987 A1 | 11/2002 | Meushaw | |
| 2002/0178353 A1 | 11/2002 | Graham | |
| 2002/0184289 A1 * | 12/2002 | Katoh et al. | 709/100 |
| 2002/0184520 A1 | 12/2002 | Bush | |
| 2002/0194612 A1 | 12/2002 | Lundberg | |
| 2003/0018909 A1 * | 1/2003 | Cuomo et al. | 713/200 |
| 2003/0033443 A1 * | 2/2003 | Igotti | 709/328 |
| 2003/0046557 A1 | 3/2003 | Miller | |
| 2003/0170011 A1 | 9/2003 | Otsuka | |
| 2003/0190950 A1 | 10/2003 | Matsumoto | |
| 2003/0196100 A1 | 10/2003 | Grawrock | |
| 2003/0196114 A1 * | 10/2003 | Brew et al. | 713/201 |
| 2003/0200454 A1 | 10/2003 | Foster | |
| 2004/0047588 A1 | 3/2004 | Okada | |
| 2004/0049694 A1 * | 3/2004 | Candelore | 713/200 |
| 2004/0067048 A1 | 4/2004 | Seo | |
| 2004/0117532 A1 | 6/2004 | Bennett | |
| 2004/0133794 A1 | 7/2004 | Kocher | |
| 2004/0175218 A1 | 9/2004 | Katzer | |
| 2004/0220926 A1 * | 11/2004 | Lamkin et al. | 707/3 |
| 2004/0268135 A1 | 12/2004 | Zimmer | |
| 2005/0019015 A1 | 1/2005 | Ackley | |
| 2005/0020359 A1 | 1/2005 | Ackley | |
| 2005/0022226 A1 | 1/2005 | Ackley | |
| 2005/0033972 A1 * | 2/2005 | Watson | 713/189 |
| 2005/0204126 A1 * | 9/2005 | Watson | 713/150 |
| 2005/0223220 A1 | 10/2005 | Campbell | |
| 2005/0257243 A1 * | 11/2005 | Baker | 726/1 |
| 2006/0021041 A1 * | 1/2006 | Challener et al. | 726/24 |
| 2006/0069925 A1 | 3/2006 | Nakai | |
| 2007/0033419 A1 | 2/2007 | Kocher | |

FOREIGN PATENT DOCUMENTS

| | | |
|---|---|---|
| EP | 1304876 | 7/2004 |
| JP | 6-214781 | 8/1994 |
| JP | 10-327381 | 12/1998 |
| JP | 2000-503154 | 3/2000 |
| JP | 2002-527843 | 8/2002 |
| WO | WO 01/65832 | 9/2001 |
| WO | WO 01/73525 | 10/2001 |
| WO | WO 02/017643 | 2/2002 |

OTHER PUBLICATIONS

Trusted Computing Group "Trusted Computing Platform Alliance", 2003, Trusted Computing Group, pp. 1-12.

Kocher, et al., *Self-Protecting Digital Content*, Cryptography Research, Inc., 1-14 (2202-2003).

Appel, A.W. "Garbage collection can be faster than stack allocation". 1987, Inf. Process. Lett. 25, 4 (Jun. 1987), 275-279.

Parlante, Nick "Pointers and Memory" 2000, Nick Parlante, retrieved from http://cslibrary.stanford.edu/102/PointersAndMemory.pdf, on Nov. 9, 2001, 31 Pages.

Non-Final Office Action dated Nov. 14, 07 for parent U.S. Appl. No. 10/880,060.

Garfinkel et al: "Flexible OS Support and Application for Trusted Computing" Proceedings of Hotos'03: $9^{th}$ Workshop on Hot Topics in Operating Systems, May 18-23, 2003, LIHUE (KAUAI), HAWAII, USA, USENIX, May 18, 2003, pp. 145-150.

* cited by examiner

MULTI VIRTUAL MACHINE ARCHITECTURE FOR MEDIA DEVICES

RELATED APPLICATION

This application is a Continuation of U.S. Utility patent application Ser. No. 10/890,009, filed Jul. 12, 2004, which is a Continuation-In-Part of U.S. Utility Patent application Ser. No. 10/880,060 filed Jun. 28, 2004, which claims the benefit of U.S. Provisional Application No. 60/481,034, filed Jun. 27, 2003, U.S. Provisional Application No. 60/481,066, filed Jul. 7, 2003, and U.S. Provisional Application 60/493,072, filed Aug. 5, 2003. The content of application Ser. No. 10/880,060, filed Jun. 28, 2004, is incorporated by reference herein in its entirety.

BACKGROUND

1. Field

The disclosure relates to developing new systems and methods of security, including copy protection for removable media players.

2. General Background and State of the Art

A virtual machine (VM) is a term used to describe software that acts as an interface between compiler code and the microprocessor (or "hardware platform") that actually performs the program's instructions. A compiler is a special program that processes statements written in a particular programming language and turns them into binary machine language or "code" that a computer's processor uses. Like a real computing machine, the virtual machine has an instruction set and manipulates various memory areas at run time. It is reasonably common to implement a programming language using a virtual machine; the best-known virtual machine may be the P-Code machine of UCSD Pascal. Also, a virtual machine may describe either an operating system or any program that runs in a computer.

Sun Microsystems, developers of the JAVA programming language and runtime environment, is well known for their development of the JAVA Virtual Machine. A JAVA virtual machine interprets compiled JAVA binary code (called byte code) for a computer's processor (or "hardware platform") so that it can perform a JAVA program's instructions.

JAVA was designed to allow application programs to be built that could be run on any platform without having to be rewritten or recompiled by the programmer for each separate platform. Once a JAVA virtual machine has been provided for a platform, any JAVA program can run on that platform. A JAVA virtual machine makes this possible because it is aware of the specific instruction lengths and other particularities of the platform.

There has been a long felt need to develop improved methods of copy protection in next generation media players, such as a DVD or CD player.

One known content security system used for DVD's is the Content Scramble System (CSS) whereby the data on a DVD is encrypted. The DVD player then decrypts the data as it reads the disc using a 40 bit decryption key. A fatal flaw of CSS, however, proved to be that its keys and algorithms were static. The encryption algorithm was reverse engineered, and every possible decryption key that would play existing DVD discs was made available. Once the secret escaped, the system was forever compromised since there was no way to renew the security algorithms or keys. There are now many programs available to consumers which remove all security from DVD content with a single "click".

Content owners do not want this to happen again, especially as the fidelity of the content increases. The next content security system should therefore not be vulnerable in this way.

Software vendors have also faced their share of piracy, but given the nature of computers, they have taken a different approach than that used in the entertainment industry for DVDs. Historically, packaged software program (i.e. computer games) manufacturers have protected their content with "procedural security". That is, there is no static pre-defined method for securing programs, instead each software producer writes or procures a "security code" to secure their content. This procedural security code varies in complexity and technique on a program by program basis, but most importantly, since each program has a different security software implementation, it is not possible to write a general purpose 'remove security' program, like those written to circumvent DVD security.

Another known method of copy protection is writing hardware specific instructions. The problem with such a method is that this is extremely limiting. With this method, a different set of instructions must be rendered for each hardware configuration. This is somewhat impractical.

Therefore, a system and a method of providing copy protection to hardware such as media players, that is not hardware specific, is desired. Furthermore, a system and a method of providing robust security, to prevent unauthorized duplication of the media is desired.

SUMMARY

A system and method of platform independent procedural copy protection is therefore provided whereby a dual virtual machine architecture is utilized. The dual virtual machine architecture comprises a high level virtual machine and a low level virtual machine. The low level virtual machine is designed to support low level media decryption and decoding functions, whereas the high level virtual machine is designed to handle application layer activities. The architecture thereby partitions security functions from application functions.

In general, a virtual machine that is best suited for procedural security more closely resembles the instruction set of an actual hardware CPU. That is, it supports pointers, and no underlying distinction is made between executable code and data. This first type of virtual machine is therefore named a low-level virtual machine (virtual machine), or a re-programmable security layer. The low-level virtual machine is designed to resemble a conventional CPU supporting tamper resistant software techniques.

The disadvantages of the low-level virtual machine is that programming errors or unexpected runtime conditions tend to be fatal, as the low-level virtual machine is designed to be very simple in its design and operation (viz., for example, the low-level security virtual machine emulates a small and simple set of logic gates, does not perform run-time "garbage" collection, and does not include balance checking and "exception handling" capabilities). However, for a security system, this fragility of the low-level virtual machine, can be considered a strength, or advantage, so that unauthorized access or attempted piracy of media can lead to a failure in the run-time operations of the system employing this virtual machine.

For applications, a high-level virtual machine that manages more of the computational details "behind-the-scenes" allows more dependable application programs to be developed that behave in a more predictable and robust fashion. A typical example of a high-level virtual machine is JAVA. For instance, JAVA does not have support for the concepts of "pointer" or explicit memory management (which are common sources of programming errors), but does support "exception handling" which helps programs and programmers handle unexpected runtime conditions in a predictable way. The high-level, or application level virtual machine is designed to be full featured, and provide for a rich application interface.

Therefore, the present system combines the benefits of both a low-level virtual machine and a high-level virtual machine in order to provide robust platform independent security functions that work in combination with other applications. Furthermore, a trusted platform module provides hardware based root of trust by securely querying and validating the execution environment.

Accordingly, in one aspect, the system and method of platform independent procedural copy protection is therefore provided to media players by combining a low-level virtual machine and a high-level virtual machine for next generation media players. The present "dual virtual machine" architecture provides a peer relationship between the virtual machines unlike the prior art where the virtual machines have a "stacked" relationship. An example of a stacked relationship is where one virtual machine is running on top of another, such as in a POWERPC (like in a Mac) running a windows emulator (x86 emulator or virtual machine), which in turn executes JAVA virtual machine.

The present disclosure further utilizes a hardware-based embedded security subsystem such as a trusted platform module (TPM) to interface with the virtual machine architecture for providing secured cryptographic computations.

In an exemplary embodiment, the present disclosure provides procedural security and copy protection to media, such as CD's and DVD's, thereby allowing the content owner much more flexible rights management than declarative systems. This flexibility can be used to implement full fledged Digital Rights Management (DRM) systems, as opposed to simple Copy Protection (CP) provided by prior art static security systems like CSS. Furthermore, such a dual virtual machine architecture may also operate on a PC environment and support the playback of media stored on a hard drive, solid state memory or that which is delivered over a network.

Thus, the present system provides copy protection to hardware, such as media players, that is not hardware specific. Also, the present system provides robust security to prevent unauthorized duplication of the media. In addition, since the two virtual machines are separate, the present system provides the advantages of distributed computing (viz., low computational complexity, low memory requirements, ease in implementation, and individualized functions for each virtual machine).

The foregoing and other objects, features, and advantages of the present disclosure will be become apparent from a reading of the following detailed description of exemplary embodiments thereof, which illustrate the features and advantages of the disclosure.

DETAILED DESCRIPTION

Detailed descriptions are disclosed herein; however, it is to be understood that the disclosed embodiments are merely exemplary and may be embodied in various forms. Therefore, specific structural and functional details disclosed herein are not to be interpreted as limiting, but merely as a basis for claims and as a representative basis for teaching one skilled in the art to variously employ the present disclosure in virtually any appropriately detailed structure. Reference will now be made in detail to that disclosure which is illustrated in the accompanying drawing (FIGS. 1-3).

The system and method of the present disclosure provides a dual virtual machine architecture for use in media players. One virtual machine (viz., the low-level virtual machine or re-configurable security layer) is designed to support security functions such as media decryption and decoding. In next-generation media applications, the low-level virtual machine may be responsible for bootstrapping the application level virtual machine. The high-level or application level virtual machine handles application layer activities, like advanced user interfaces, misc. I/O, and network activities.

Figure 1:
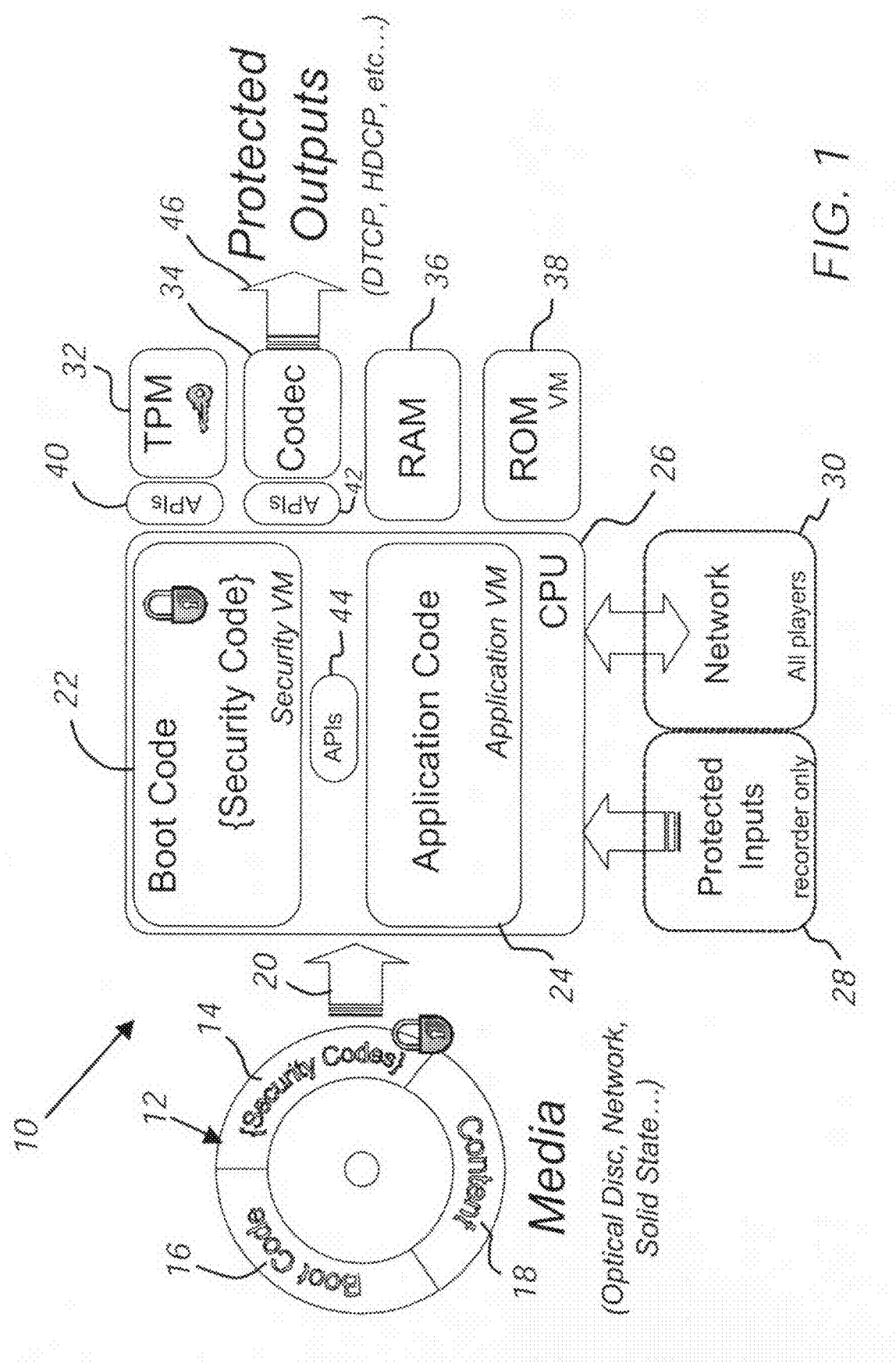
FIG. 1 is a diagram of a media player architecture in a computing environment according to an exemplary embodiment.
Figure 2:
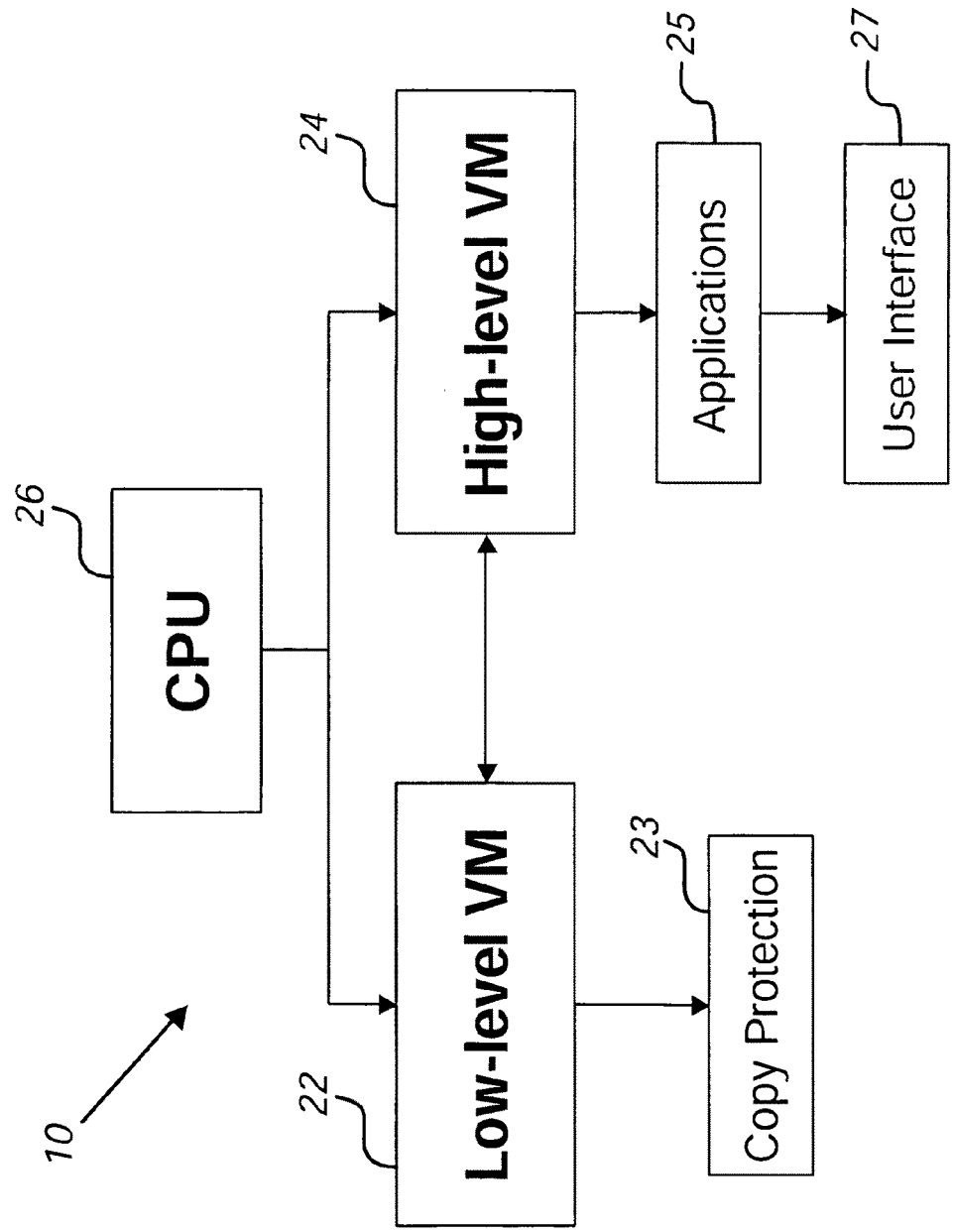
FIG. 2 is a block diagram depicting the interaction and functionalities of the low-level virtual machine and the high-level virtual machine according to an exemplary embodiment.
Figure 3:
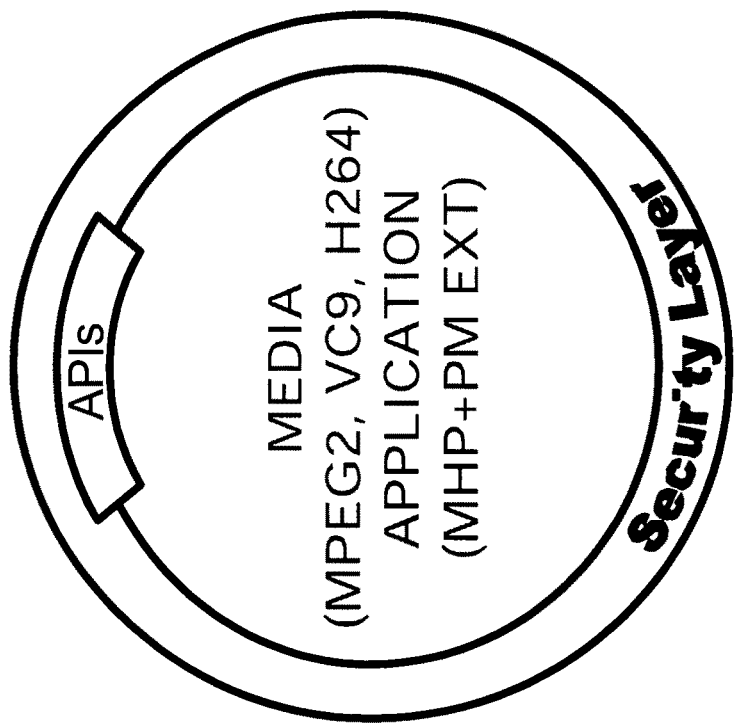
FIG. 3 is a diagram depicting an exemplary application program (e.g., MPEG-2) being run inside the "outer" security layer, where the communication between the program and the security layer occurs through APIs.

FIGS. 1 and 2 depict a media player architecture in a computing environment 10 according to an exemplary embodiment. Specifically, shown therein is a media source (e.g., a DVD, an optical disk, a solid-state device, or a network) that includes media data or content 18, security codes 12 for permitting the media to be played back on the media player, and boot codes 16. Boot codes 16 stored on the media, and which may or may not be encrypted, are made available to the firmware of a media player for processing by the virtual machines such as the security low-level virtual machine.

The media playback device in accordance with the present disclosure contains a central processing unit 26 capable of running at least one Virtual Machine (virtual machine). The Virtual Machine, in an exemplary embodiment, is a dual virtual machine architecture, comprising a low-level virtual machine (e.g., a security virtual machine) 22 and a high-level virtual machine (e.g., an application virtual machine) 24 running on the CPU 26. Programs that are run in the virtual machine may execute and enforce usage rules as well as update cryptographic algorithms. The computing environment 10 may also include Application Program Interfaces (API's) 40-44 which are a set of routines or protocols for permitting various programs to communicate with each other.

In one aspect, any one of the virtual machines (22 or 24) may control the other virtual machine. In another aspect, the high-level and low-level virtual machines function as peers, in a non-hierarchical manner, passing messages between themselves. These messages may be implemented as "foreign-function calls", where one virtual machine calls a routine in the other virtual machine, or as conventional messages passed along a communications channel. For instance, the application virtual machine (or high-level virtual machine) 24 would call the security-virtual machine (or low-level virtual machine) 22 in order to start playback (and hence transparent decoding) of media content 18. Likewise, code in the security virtual machine 22 would call the application virtual machine 24 to let it know about synchronization events (e.g., an end of clip or a frame number) or decoding problems (for example security or permission problems).

For example, in the situation where media has been copied off of its original optical media, the security virtual machine 22 would inform the application virtual machine 24 that it needs a key in order to continue playing. In response, the application virtual machine 24 would display a message, through the user interface 27, notifying the user that they may "rent" the media (or media content) for a certain duration. If the user chooses to do this, the user must engage in a transaction with a studio server to obtain an 'opaque message' (decodable by the virtual machine) that contains the key. The application virtual machine 24 then passes the message containing the key back to the security virtual machine 22 and the copy protection algorithms 23 for authentication. The message passing between the virtual machines could occur through a "remote procedure call" (RPC) interface, message passing, "socket" or any other equivalent inter-process communication (IPC) protocol.

In another example of message passing between virtual machines, media downloaded via a communication network onto a storage medium of a device (e.g., a PC, portable media device, etc.), without appropriate permission, would be delivered to the security virtual machine. The security virtual machine would in turn inform the application virtual machine 24 that it would require a key in order to playback the media. The application virtual machine could deliver a message to the user, via the user interface, requesting the user subscribe to the media. Accordingly, upon subscription, the remote site may send a unique key to the application virtual machine, on the communication network, for subsequent delivery to the security virtual machine for decoding and authorization of media playback.

In yet another example of message passing between the virtual machines, since the application level virtual machine (i.e., high-level virtual machine) controls the input-output (I/O) functions, it may send a message to the security virtual machine (i.e., low-level virtual machine) to playback a file whenever a user selects a file for playback.

In yet another example of message passing between the virtual machines, the high-level virtual machine may deliver a request for signature on a form to the security virtual machine. The security (low-level) virtual machine may sign the form after verification and deliver it back to the high-level virtual machine. At this point, the high-level virtual machine may provide the signed form to a communication network for delivery to a remote site.

In yet another example of message passing between the virtual machines, the application layer (viz., the high-level virtual machine) may provide graphics on the screen for enabling an user to enter a personal identification number (PIN) in an alphanumeric field comprising N characters. Upon insertion of the PIN by the user through a standard interface (e.g., through keyboard or voice commands), the high-level virtual machine may deliver the N character PIN to the security virtual machine for authentication. In the situation where the PIN is missing at least one or more alphanumeric characters (viz., if the PIN length is M<N), the security virtual machine would identify this as a "synchronization" problem and notify the high-level virtual machine to deliver a message to the user indicating this fact.

In yet another example, the security virtual machine 22 may: (i) load the boot code 16 (and as needed the security codes 16 as well), (ii) find and load the main application or content 18 into the high-level application layer virtual machine 24, from the media source 12, (iii) start the high-level application layer virtual machine 24. Subsequently, the high-level virtual machine 24 will obtain data such as menu functions, icons, user interface, etc. from the media source 12.

The media playback device further contains a processing module (e.g., a Trusted Processing Module or TPM) 32. The TPM specification is part of the Trusted Computing Platform Alliance (TCPA) specification created by the Trusted Computing Group (TCG). The TPM 32 contains decryption keys and handles secure cryptographic computations. The media playback device further contains API's 40, 42 allowing any program running in the Virtual Machine to query the device's I/O hardware and TPM. This allows a program executing in the virtual machine to make intelligent choices for usage rules. A decoding module 34, attached to the CPU 26, is further provided for unpacking encoded audio/video streams.

In general, a trusted platform enables an entity to determine the state of the software or computing environment 10 in that platform and to seal data to a particular software environment in that platform. The entity deduces whether the state of the computing environment is acceptable and performs some transaction with that platform. If the transaction involves sensitive data that must be stored on the platform, the entity can ensure that that data is held in a confidential format unless the state of the computing environment in that platform is acceptable to the entity.

To enable this, a trusted platform provides information to enable the entity to deduce the software environment in a trusted platform. That information is reliably measured and reported to the entity. At the same time, a trusted platform provides a means to encrypt cryptographic keys and to state the software environment that must be in place before the keys can be decrypted.

A "trusted measurement root" measures certain platform characteristics, logs the measurement data in a measurement store, and stores the final result in a TPM (which contains the root of trust for storing and reporting integrity metrics). The TPM is therefore a secure storage location for all decryption keys. The TPM also handles most cryptographic computations and functions.

The media playback device furthermore has secure, protected inputs and outputs 28, the ability to network with other players 30, memory devices (e.g., RAM 36 and ROM 38).

Thus, according to the exemplary embodiment, separate virtual machines (virtual machine) run in the same computing environment that includes a CPU. The present architecture partitions two virtual machines (viz., the high-level or application virtual machine and the low-level or security virtual machine), wherein the application and security virtual machines communicate through standardized APIs. The functionalities of the application virtual machine includes providing network services to the security code being executed in the security virtual machine, whereas media access and decoding functions are mediated by the security virtual machine such that content security is transparent to application authors.

The security virtual machine has low impact on system resources, is a simple, has low computational complexity, secure, and appropriate software for this virtual machine may be provided by security vendors. The application virtual machine has relatively larger CPU and memory impact and is responsible for user Interface and input/output functions. By providing a distributed computing approach (viz., multiple virtual machines communicating in a peer relation and each handling appropriate security and application oriented functions), the present system provides a robust security to the media against unauthorized access with low computational complexity.

In addition, with the present system, it is possible to have more than two virtual machines, wherein the virtual machine's would include arbitrary combinations of low-level and high-level virtual machines. For example, applications can be written in a first virtual machine (e.g., FLASH from Macromedia), and these applications may then be exported to another virtual machine (e.g., JAVA) residing on a player that further includes a security virtual machine.

In another embodiment of the present system, the security system can yet be designed in the absence of a re-programmable security layer or low-level virtual machine. In other words, a "static" security system may be implemented as long as the media player supports APIs (Application Programming Interfaces) that allow the Application Layer (e.g., Multimedia Home Platform MHP) or JAVA) to interact with it. Not only does this technique allow the application layer to extend the life of the security system by acting as an programmable extension of the security subsystem, it also allows the application to enable new business models by performing functions such as fetching content licenses from the Internet after some user interaction.

For example, in the event that the decryption keys for a piece of media have been compromised, a hacker could very easily decrypt all the content on a piece of packed media. In a conventional system, such as a DVD, this "clear" (non-encrypted) content could be played uninhibitedly. However, in the presence of a "security aware" application code, as in the present system, the task of pirating or copying media is no longer easy or automatic.

Thus, in the present example of above, instead of creating one or two large media files (audio and video), as is typically done, the present system may segment a movie in to K (for e.g., K=32) smaller pieces such that the application layer may play them in a seamless sequence. Furthermore, the present system may also scramble those segments such that the correct "forward order" could be numerically labeled: 17,5,31, 4,12, etc. This information can be stored in a correct order in an encrypted (viz., desired) array in the application itself. This encrypted array and its decryption can then be implemented using code obfuscation tools and techniques in the media device. The goal of this obfuscation technique is to defeat simple static analysis methods, developed by hackers, that would allow a program to determine the value of the array and hence the correct order in which to play the segments.

Thus, the goal of the present system is to require the execution of the application code in order to generate the desired array. Additionally, the application code may make calls into the security layer, via the implemented API's, in order to increase the application's dependence on being run inside the environment created by the "outer" security layer as depicted in FIG. 3. The array technique, as mentioned above, is only one example of putting some "necessary data" in the application layer, outside of the possible compromised security layer.

Thus, if the "outer security" layer is broken, for any single piece of media, it is possible to emulate the behavior of the security layer and it's interaction with the application layer. However, in the present system the application layer program is designed to change from media to media in such a way that one automatic program is not practical to write by a person intending to copy the data in an unauthorized manner.

Thus, in this manner the present system provides copy protection to hardware, such as media players, that is not hardware specific. Additionally, the present system provides robust security to prevent unauthorized duplication of the media.

The foregoing description of the preferred embodiments of the disclosure has been presented for the purposes of illustration and description. Other objects, features, and advantages of the present disclosure will be become apparent from a reading of the following Appendix. It is not intended to be exhaustive or to limit the disclosure to the precise form disclosed. Many modifications and variations are possible in light of the teachings. For example, the present disclosure is not limited for use in media players such as conventional CD and DVD players, but could be expanded to run on a PC, or more generalized hardware system which includes functionality to play removable media.

What is claimed is:

1. A media player for providing media security protection to a medium, the media player comprising:
    a security virtual machine configured to perform security decryption and decoding functions for the media player;
    an application virtual machine configured to perform application level functions for the media player; and
    a processing unit configured to run the security virtual machine and the application virtual machine;
    wherein the security virtual machine is further configured to use a security instruction set for performing the security decryption and decoding functions, and the application virtual machine is further configured to use an application instruction set for performing the application level functions, wherein the security instruction set for performing the security decryption and decoding functions is different than the application instruction set for performing the application level functions, wherein the security virtual machine is a different type of virtual machine than the application virtual machine, and wherein the application virtual machine is a JAVA-based virtual machine, and the security virtual machine is not a JAVA-based virtual machine.

2. The media player of claim 1 further comprising: an application program interface (API) permitting the security virtual machine and the application virtual machine to communicate with each other through the API.

3. The media player of claim 1, wherein the medium includes security codes for use by the security virtual machine.

4. The media player of claim 3, wherein the application virtual machine is configured to deliver the security codes to the security virtual machine.

5. The media player of claim 1, wherein the medium includes a boot code, and wherein the security virtual machine is configured to decrypt the boot code.

6. The media player of claim 1, wherein the security virtual machine is configured to deliver information related to synchronization events to the application virtual machine.

7. The media player of claim 1, wherein the application virtual machine is a high level virtual machine and the security virtual machine is a low level virtual machine.

8. The media player of claim 1, wherein the security virtual machine does not include an exception handling capability, and wherein the application virtual machine includes the exception handling capability.

9. The media player of claim 1, wherein the security virtual machine utilizes a copy protection algorithm.

10. A method of providing media security protection to a medium, the method comprising:
    performing security decryption and decoding functions for the media player using a security virtual machine running on a processing unit, the security virtual machine using a security instruction set for performing the security decryption and decoding functions;
    performing application level functions for the media player using the application virtual machine running on the processing unit, the application virtual machine using an application instruction set for performing the application level functions;

wherein the security instruction set for performing the security decryption and decoding functions is different than the application instruction set for performing the application level functions, wherein the security virtual machine is a different type of virtual machine than the application virtual machine, and wherein the application virtual machine is a JAVA-based virtual machine, and the security virtual machine is not a JAVA-based virtual machine.

11. The method of claim 10 further comprising:

permitting the security virtual machine and the application virtual machine to communicate with each other through an application program interface (API).

12. The method of claim 10, wherein the medium includes security codes for use by the security virtual machine.

13. The method of claim 12 further comprising: the application virtual machine delivering the security codes to the security virtual machine.

14. The method of claim 10, wherein the medium includes a hoot code, and wherein the method further comprising: the security virtual machine decrypting the boot code.

15. The method of claim 10 further comprising: the security virtual machine delivering information related to synchronization events to the application virtual machine.

16. The method of claim 10, wherein the application virtual machine is a high level virtual machine and the security virtual machine is a low level virtual machine.

17. The method of claim 10, wherein the security virtual machine does not include an exception handling capability, and wherein the application virtual machine includes the exception handling capability.

18. The method of claim 10 further comprising: the security virtual machine utilizing a copy protection algorithm.

* * * * *